US012085478B1

(12) United States Patent
Gillaugh et al.

(10) Patent No.: US 12,085,478 B1
(45) Date of Patent: Sep. 10, 2024

(54) METHOD AND SYSTEM FOR IMPROVING STRAIN GUAGE TO BLADE TIP TIMING CORRELATION

(71) Applicant: Government of the United States, as represented by the Secretary of the Air Force, Wright-Patterson AFB, OH (US)

(72) Inventors: Daniel Gillaugh, Troy, OH (US); Alexander Kaszynski, Layfayette, CO (US); Jeffrey Brown, Bellbrook, OH (US)

(73) Assignee: Government of the United States of America as Represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/295,293

(22) Filed: Apr. 4, 2023

Related U.S. Application Data

(62) Division of application No. 17/493,955, filed on Oct. 5, 2021, now Pat. No. 11,650,130.

(60) Provisional application No. 63/094,974, filed on Oct. 22, 2020.

(51) Int. Cl.
*G01M 15/14* (2006.01)
*G01B 11/06* (2006.01)
*G01B 11/26* (2006.01)
*G01L 1/22* (2006.01)

(52) U.S. Cl.
CPC ......... *G01M 15/14* (2013.01); *G01B 11/0691* (2013.01); *G01B 11/26* (2013.01); *G01L 1/22* (2013.01)

(58) Field of Classification Search
CPC .... G01M 15/14; G01B 11/0691; G01B 11/26; G01L 1/22
See application file for complete search history.

(56) References Cited

U.S. PATENT DOCUMENTS

| 5,162,659 A * | 11/1992 | Diamond | G01B 11/24 356/612 |
| 8,230,726 B2 | 7/2012 | Hafner | |
| 11,225,880 B1 * | 1/2022 | Shoemaker | F01D 17/02 |
| 2007/0132461 A1 * | 6/2007 | Holmquist | F01D 17/02 324/642 |
| 2012/0026323 A1 * | 2/2012 | George | F03D 17/00 348/142 |

(Continued)

OTHER PUBLICATIONS

Mohamed, A novel method for the determination of the change in blade tip timing probe sensing position due to steady movements, Mechanical Systems and Signal Processing; Feb. 8, 2019; pp. 686-710; United Kingdom.

(Continued)

*Primary Examiner* — Eric S. McCall
(74) *Attorney, Agent, or Firm* — AFMCLO/JAZ; Matthew Fair

(57) ABSTRACT

The present disclosure is directed to a method and system to develop finite element (FE) models of as-manufactured turbomachinery blades using a combination of optical topography measurements, mesh morphing and strain gauge measurements. The method and system improves strain gauge to blade tip timing correlation using as-manufactured blade dimensions with finite element modeling.

3 Claims, 6 Drawing Sheets

(56) References Cited

U.S. PATENT DOCUMENTS

| | | | | |
|---|---|---|---|---|
| 2012/0266680 | A1* | 10/2012 | Boyer | G01B 11/2545 73/655 |
| 2012/0296593 | A1* | 11/2012 | Seccombe | G01B 7/023 702/94 |
| 2014/0030092 | A1* | 1/2014 | Heinig | F02C 9/00 416/61 |
| 2015/0097580 | A1* | 4/2015 | Singh | G01M 15/14 324/644 |
| 2015/0153310 | A1* | 6/2015 | Yamamoto | G01N 29/04 73/627 |
| 2016/0258440 | A1 | 9/2016 | Henry | |
| 2021/0172859 | A1* | 6/2021 | Liu | G01N 17/04 |
| 2022/0281198 | A1* | 9/2022 | Le Cloarec | B29D 99/0025 |
| 2022/0389903 | A1* | 12/2022 | Glud | F03D 1/0675 |
| 2023/0166454 | A1* | 6/2023 | Sheppard | B33Y 10/00 264/349 |

OTHER PUBLICATIONS

Russhard, Blade tip timing (BTT) uncertainties, AIP Conference Proceedings 1740. 020003 (2016); https://doi.org/10.1063/1.4952657 Published Online, Jun. 28, 2016; pp. 1-13; United Kingdom.

Mohamed, Determination of Simultaneous Steady-State Movements Using Blade Tip Timing Data; Journal of Vibration and Acoustics, Feb. 2020, vol. 142, pp. 1-9; United Kingdom.

Kharyton, Using Tiptiming and Strain Gauge Data for the Estimation of Consumed Life in a Compressor Blisk Subjected To Stall-Induced Loading; ASME Turbo Expo 2014: Turbine Technical Conference and Exposition GT2014Siemens Industrial Turbomachinery AB SE-612 83; pp. 1-10; Sweden.

Gillaugh, F; Orced Response Variation of a Compressor Utilizing Blade Tip Timing, Strain Gages, and As-Manufactured Finite Element Models; SME Turbo Expo 2020: Turbomachinery Technical Conference and Exposition GT2020; pp. 1-12; England.

* cited by examiner

Plot of stress/deflection ratio us Chord % for identified blades

METHOD AND SYSTEM FOR IMPROVING STRAIN GUAGE TO BLADE TIP TIMING CORRELATION

PRIORITY

Pursuant to 37 C.F.R. § 1.78(a)(4), this application is a Divisional of U.S. patent application Ser. No. 17/493,955 filed Oct. 5, 2021, which claims the benefit of and priority to U.S. Provisional Patent Application Ser. No. 63/094,974 filed Oct. 22, 2020, both which are expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to correlating experimental strain gauge data and blade tip timing data using advanced Finite Element Analysis Modeling (FEA) of rotor blades such as compressor or turbine blades of a gas turbine engine.

BACKGROUND

The dynamic response of turbine engine components are measured using a combination of strain gauges, blade tip timing, and finite element models. Strain gauges have a short mortality rate and measure a finite number of blades, where blade tip timing sensors like spot probes are capable of investigating each blade throughout testing duration. Common engineering practice entails a correlation between strain gauge data and blade tip timing data to ensure greater blade tip timing accuracy throughout testing when strain gauges are no longer functional. Correlation is conducted using a combination of experimental data and predictions from finite element models. Traditionally, predictions like stress/deflection ratios from as-designed finite element models are used for correlations. However, manufacturing deviations in blades known as mistuning causes variation in the dynamic response between blades. It is desirable to account for manufacturing deviations to improve stress/deflection predictions, thus, improving strain gauge to blade tip timing correlations. Accordingly, there remains a need for further contributions in this area of technology.

SUMMARY

One embodiment of the present disclosure includes a unique method for determining and verifying blade integrity on rotors for turbomachinery such as pumps, compressors and turbines or the like. Other embodiments include apparatuses, systems, devices, hardware, methods, and combinations wherein a blade tip measuring technique is used in conjunction with strain gauge data to validate finite element analysis modeling to determine stress levels at a particular rotational speed. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
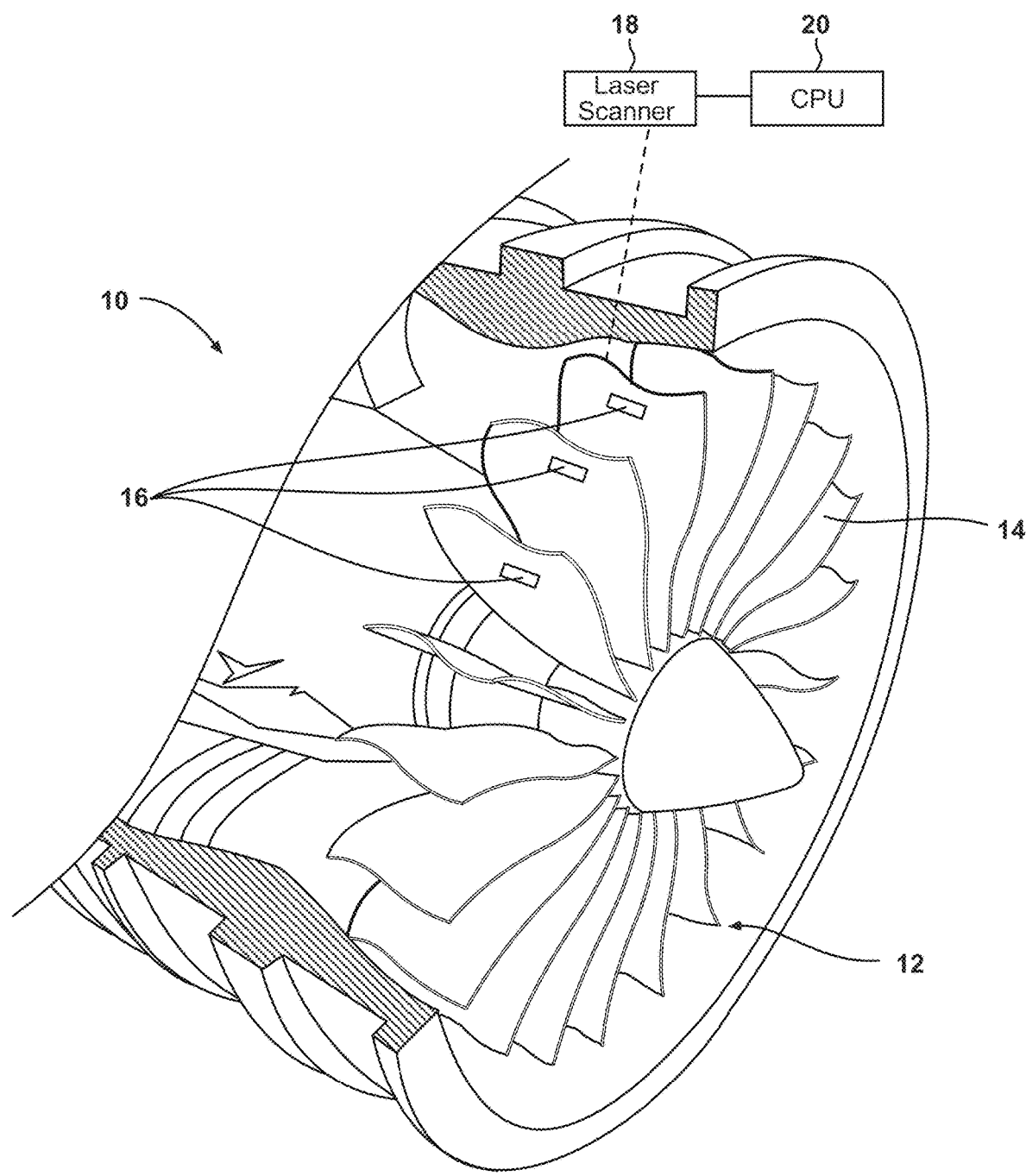
FIG. 1 is a perspective view of a portion of a representative turbomachine according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is directed to a novel method and system to improve strain gauge to blade tip timing correlation by developing advanced finite element (FE) models of as-manufactured turbomachinery blades using a combination of optical topography measurements, mesh morphing and blade tip timing measurements. The term as-manufactured differs from the term as-designed in that real blades are made to manufacturing specifications with tolerances. As such, each manufactured blade has slightly different dimensions and thus mechanical properties relative to other blades. As-manufactured FE models allow for more accurate finite element model predictions for use in strain gage to blade tip timing correlation. Strain gauge to blade tip timing correlation is performed using two approaches: 1) blade maximum stress comparisons and 2) measured response compared to the sensor safety limits.

Initial correlations are done using an averaged finite element model and experimental results with errors presented between strain gauges and blade tip timing results for a given vibratory mode. As-designed finite element models assume spot probes measure blade deflection at a given chord location. During operation, there are multiple factors that occur that can change the actual spot probe measurement location including, but not limited to angle of blade untwist, vibratory modes, radial deflections due to centripetal force, axial shift due to bearing clearances, etc. When the measurement location is changed, the analytical stress/deflection ratio predictions will also change which causes the strain gauge/blade tip timing correlation to change.

A novel experimental model updating procedure is developed using as-manufactured models to improve the strain gauge to blade tip timing correlation by optimizing the measurement location of the blade tip timing optical spot probes based on the blade chord thickness dimensions. Using both the average and as-manufactured finite element models, the optical spot probe measurement location can be varied across the blade chord to assess the variability spot probe measurement location has on the predicted stress/deflection ratios used to perform strain gauge to blade tip timing correlation. The actual thickness of each blade chord can be measured using optical scanning systems and mesh morphing approaches. This process provides the blade thickness as a function of chord length.

Similarly, blade tip timing probes can be configured in such a way to measure blade thickness during experimental testing. As the blade passes through the spot probe, a rising edge is produced. Conversely, as the blade exits the spot probe, a falling edge is produced. A trigger level is set as a threshold to record probe waveform data. By measuring the time between the rising edge trigger and falling edge trigger, the as-measured blade width can be calculated by converting this time to distance. This novel approach superimposes the experimentally calculated deformed blade thickness onto the as-manufactured finite element model blade thickness to determine the actual measurement spot probe measurement location for each as-measured blade. Using the updated measurement location, strain gauge to blade tip timing correlations are dramatically improved for a given mode. The outline model updating approach using experimental data is now possible with the use of as-manufactured models and mesh morphing approaches that allow optical scans of the targeted geometry to be aligned to existing finite element models in order to modify the surface nodes of the finite element model to match the tessellated surface data of the scanned geometry. This procedure allows for improved strain gauge to blade tip timing correlation by accounting for the actual geometry of each blade in conjunction with the deformed blade shape measurement.

An exemplary method to improve strain gauge to blade tip timing correlation is defined by the following procedure:
1. Perform optical scan of turbomachinery.
2. Develop nominal finite element model (FEM) from the optical scan.
3. Morph nominal FEM to create as-manufactured model (AMM) for each blade sector.
4. Calculate stress/deflection (S/D) & strain gage (SG) ratios for both nominal and AMM blades
   a. Using combination of FEA solvers and mathematical algorithms.
   b. Analyze S/D variation as a function of spot probe measurement location across the blade chord.
   c. Predicted S/D ratios are used in conjunction with experimental tip deflection data to determine maximum stress in each blade.
   d. Predicted SG ratios are used in conjunction with experimental strain gage measurements to determine maximum stress in each blade.
5. Using as-manufactured models, calculate chord thickness of each blade as a function of blade chord. Note that measurable chord variation is required for method to work accurately.
   a. As-manufactured chord thickness calculated using perceived thickness of analyzed deformed blade.
   b. Configure experimental blade tip timing probes to measure perceived blade thickness
   c. Using optical spot probes, the blade width is measured due to the blade angle of attack.
   d. Optical spot probes produces a rising edge as the blade passes through the spot probe, and a falling edge as the blade exits the spot probe. The measurement of the time between the start of the rising edge and the end of the falling edge of the waveform is the measured blade width.
   e. A single optical signal is split into two channels. One channel triggers on the rising edge, where one channel triggers on the falling edge. The trigger level should be set out of the noise floor.
   f. The measurement of time between the rising and falling edge of the digital trigger output signal is used for the perceived blade width measurement. This measured time is converted to distance (mils) and this is the measured blade width.
   g. The experimentally calculated deformed blade thickness is superimposed onto the as-manufactured FEM blade thickness (Step 5). The output of this superposition is the actual percent chord measurement location of the spot probe for each as-manufactured blade.
   h. Update measurement location of optical spot probe in each as-manufactured model and generate new S/D ratios for each blade.
   i. Using new S/D ratios calculated using a combination of experimental and analytical measurements, update strain gage to blade tip timing correlation. Using the update measurement location, strain gage to blade tip timing correlations are dramatically improved for a given mode.

Referring now to FIG. 1, a perspective view of a portion of an exemplary turbomachine 10 is illustrated. It should be noted that the disclosed turbomachine 10 depicts a fan rotor of a turbofan gas turbine engine, however any rotor component of any turbomachine may be analyzed by the method and system disclosed herein. By way of example and not limitation, the rotor may be a fan, a compressor, a turbine a pump or other types in turbomachine. The turbomachine 10 includes a rotor 12 having a plurality of blades 14. One or more of the blades 14 can include a strain gauge 16 operably connected thereto. The strain gauges 16 can be used to measure strain on the blade 14 as the rotor 12 rotates at operational speeds. A laser scanner 18 is operable to measure the position of the blades 14 as they rotate and are deflected from their relative static position on the rotor 12. The laser scanner 18 can measure points on the blades 14 such as the tip of the leading edge and trailing edge as they rotate past a laser beam. In this manner the twist, bending and other deflections can be measured and correlated with the strain data as measured by the strain gauges 16. A computer 20 can be operably connected to the laser scanner 18 and the strain gauges 16 so that computational analysis can be performed and correlations can be defined between blade position as measured by the laser scanner 18 and the strain as measured strain gauges 16.

Figure 2:
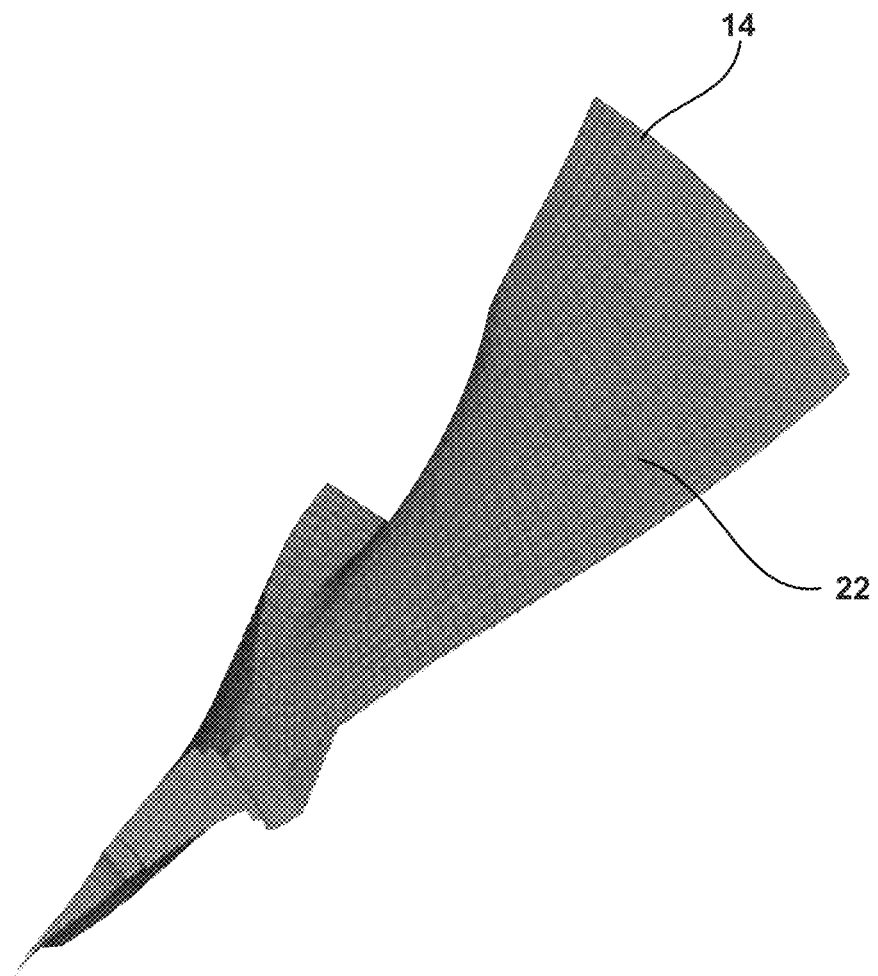
FIG. 2 is a perspective view of a representative blade with a finite element mesh.

Referring now to FIG. 2, an exemplary blade 14 showing a finite element mesh 22 is illustrated. The blade 14 can be analyzed with a finite element computational model using experimental data obtained by the laser scanner 18 and the strain gauges 16.

Figure 3:
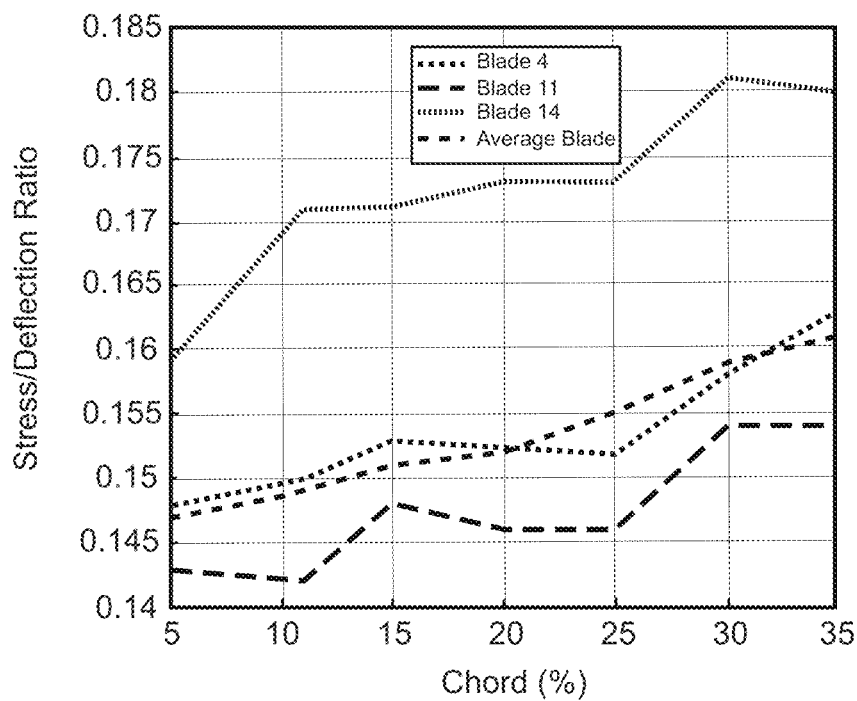
FIG. 3 is a graph showing stress/deflection ratio vs. Chord percent for a set of identified blades.
Figure 4:
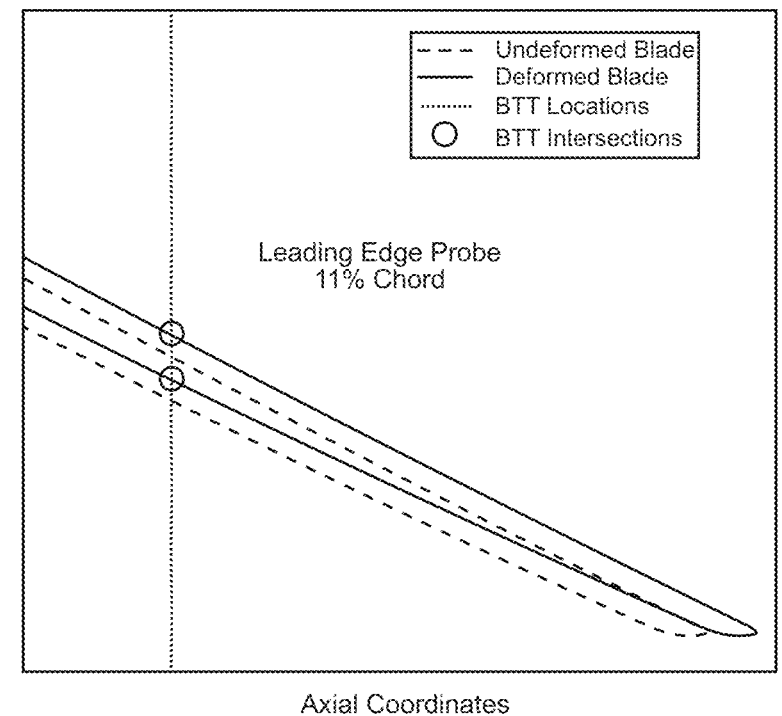
FIG. 4 is a graph showing leading edge probe positioning as a function of circumferential angle and axial coordinates.
Figure 5:
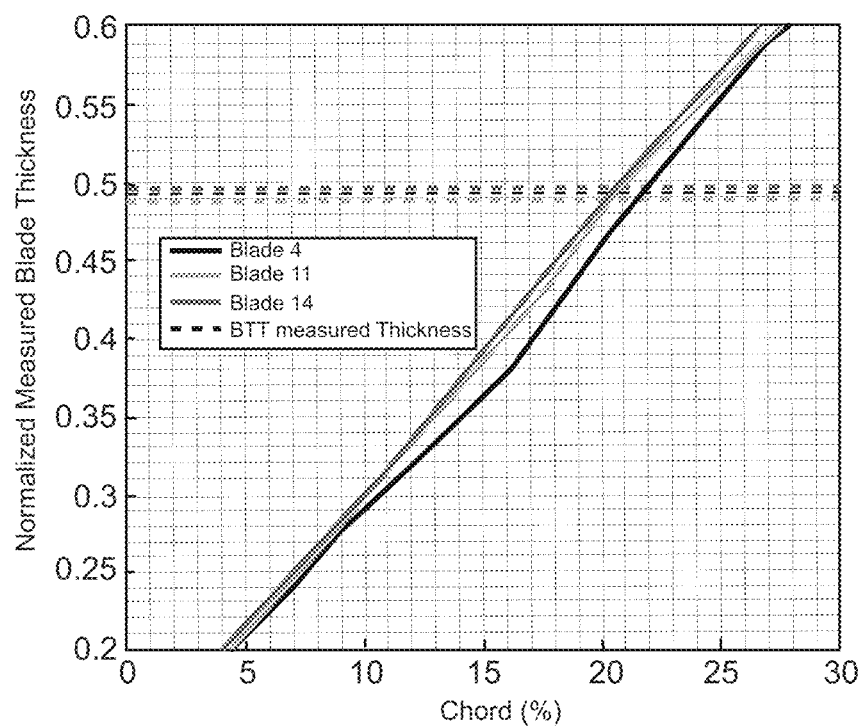
FIG. 5 is a graph showing normalized measured blade thickness as a function of chord position.
Figure 6:
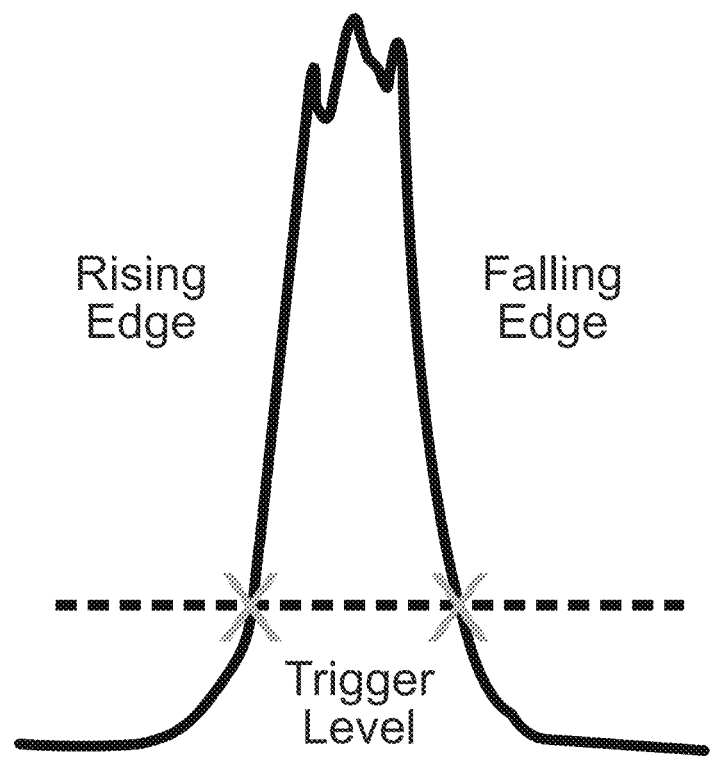
FIG. 6 is a trace showing trigger level position at a rising edge and a falling edge of a blade.
Figure 7:
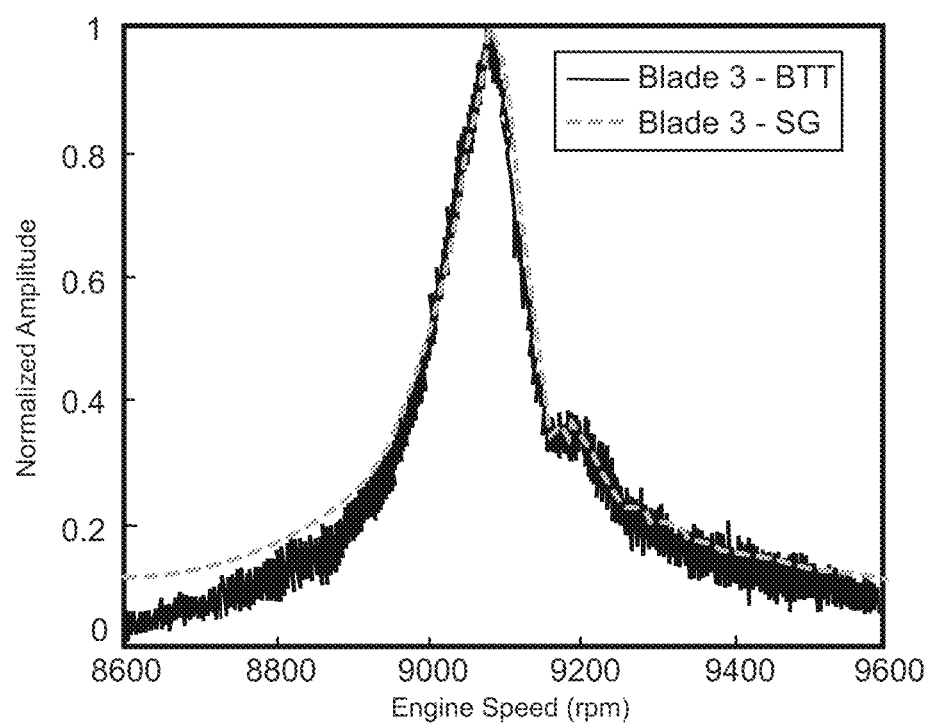
FIG. 7 is a graph showing normalized amplitude of a blade as a function of engine speed.

FIG. 3 is a plot of stress deflection ratio of the blade as a function of the chord percent. FIG. 4 is a plot of blade circumferential angle as a function of axial coordinates of the blade as measured by the laser scanner at the leading edge and 11 percent chord of the blades. FIG. 5 is a plot of normalized measured blade thickness as a function of chord percent of the blades. FIG. 6 shows a measured trace from the laser scanner where the trigger levels are defined at the leading edge and trailing edge of the blade. FIG. 7 shows a plot of normalized amplitude as a function engine speed for both blade tip timing data and strain gauge data. The data shown in FIGS. 3-7 is used to create an analytical model to predict blade stress based on the position of the blades as determined by the laser scanner 18 after the strain gauges are no longer operational.

In one aspect the present application includes a method comprising: measuring an actual thickness of a blade with a laser probe at a first chord location and a first rotor speed;

comparing the as-measured thickness to an as-design thickness of the blade at the first chord location; updating probe measurement location in a finite element model using the comparison of actual blade thickness to the as-designed thickness; correlating a blade tip timing data with experimental strain gauge data using an as-designed blade stress model as a function of rotor speed; using the finite element analysis model to transform the as-designed stress model to an as-manufactured blade stress model; determining actual stress/deflection ratios for as-manufactured blades at the first chord location as a function of the rotor speed; and using updated stress/deflection ratios derived from as-manufactured models and experimentally measured chord thickness to define an as-designed strain gauge to blade tip timing correlation.

In refining aspects the method includes comparing a laser measurement at a rising edge of the blade with a laser measurement at the falling edge of the blade to determine the actual width of the blade at the first chord location; and repeating the steps recited above at a second chord location.

In another aspect, a system comprises a laser scanner operable for scanning and determining a position of a rotating blade in a turbomachine; a strain gauge operable for measuring a strain of the rotating blade; a computer operable for receiving and processing data obtained by the laser scanner and the strain gauge; an analytical computational correlation model generated by the computer from the processed data; and wherein blade stress is determined from analytical computational correlation model from blade tip timing data in experimental tests without strain gauge data.

In refining aspects, the laser scanner is operable to measure a thickness of the blade at a desired location; the thickness of the blade measurement is input into an as manufactured finite element model; and the as manufactured finite element model provides a calculated stress for a plurality of locations on the as manufactured blade a predetermined operating condition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a laser scanner operable for scanning and determining a position of a rotating blade in a turbomachine;
   a strain gauge operable for measuring a strain of the rotating blade;
   a computer operable for receiving and processing data obtained by the laser scanner and the strain gauge;
   an analytical computational correlation model generated by the computer from the processed data;
   wherein blade stress is determined from an analytical computational correlation model without strain gauge data; and
   wherein the laser scanner is operable to measure a thickness of the blade at a desired location.

2. The system of claim 1, wherein the thickness of the blade measurement is input into an as manufactured finite element model.

3. The system of claim 2, wherein the as manufactured finite element model provides a calculated stress for a plurality of locations on the as manufactured blade.

* * * * *